United States Patent
Zhang

(10) Patent No.: US 12,117,909 B2
(45) Date of Patent: Oct. 15, 2024

(54) SYSTEM AND METHOD FOR FAST DIAGNOSIS OF REGISTER OF LOCKSTEP MODULE OF SLOW CLOCK DOMAIN

(71) Applicant: Nanjing SemiDrive Technology LTD., Nanjing (CN)

(72) Inventor: Muwei Zhang, Nanjing (CN)

(73) Assignee: Nanjing SemiDrive Technology LTD., Nanjing (CN)

( * ) Notice: Subject to any disclaimer, the term of this patent is extended or adjusted under 35 U.S.C. 154(b) by 73 days.

(21) Appl. No.: 18/162,022

(22) Filed: Jan. 31, 2023

(65) Prior Publication Data
US 2024/0045775 A1 Feb. 8, 2024

(30) Foreign Application Priority Data

Aug. 8, 2022 (CN) .......................... 202210943299.9

(51) Int. Cl.
*G06F 11/16* (2006.01)
*G06F 11/07* (2006.01)

(52) U.S. Cl.
CPC ........ *G06F 11/1658* (2013.01); *G06F 11/079* (2013.01)

(58) Field of Classification Search
CPC ............. G06F 11/1679; G06F 11/1675; G06F 11/1658; G06F 11/1629; G06F 11/165; G06F 11/1654; G06F 11/079
USPC ..................................................... 714/11, 12
See application file for complete search history.

(56) References Cited

U.S. PATENT DOCUMENTS

| | | | |
|---|---|---|---|
| 11,175,340 B1* | 11/2021 | Srivastava | G01R 31/31701 |
| 2002/0124202 A1 | 9/2002 | Doody et al. | |
| 2019/0361786 A1* | 11/2019 | Arai | G06F 11/1641 |
| 2020/0073806 A1* | 3/2020 | Hayakawa | G06F 12/0815 |
| 2020/0309851 A1* | 10/2020 | Narayanan | G01R 31/318555 |

FOREIGN PATENT DOCUMENTS

| EP | 2722760 A1 | 4/2014 |
|---|---|---|
| WO | 2004051907 A2 | 6/2004 |

OTHER PUBLICATIONS

The European Patent Office (EPO) The Extended European Search Report for 23164365.1 Jan. 2, 2024 8 Pages.

* cited by examiner

*Primary Examiner* — Chae M Ko
(74) *Attorney, Agent, or Firm* — ANOVA LAW GROUP, PLLC

(57) ABSTRACT

A system for diagnosing a register of a lockstep module of a slow clock domain, includes a functional intellectual property (IP) core and a lockstep IP core configured to work in the slow clock domain, a fast bus module configured to read a value of a register of the functional IP core and a value of a register of the lockstep IP core, and record a state change of the register of the functional IP core, and a central processing unit (CPU) configured to determine whether the register of the functional IP core and the register of the lockstep IP core are normal according to the value of the register of the functional IP core, the value of the register of the lockstep IP core, and the state change of the register of the functional IP core.

20 Claims, 5 Drawing Sheets

SYSTEM AND METHOD FOR FAST DIAGNOSIS OF REGISTER OF LOCKSTEP MODULE OF SLOW CLOCK DOMAIN

CROSS-REFERENCE TO RELATED DISCLOSURE

The disclosure claims priority of Chinese Patent Disclosure No. 202210943299.9, filed on Aug. 8, 2022, the entire content of which is incorporated herein by reference.

TECHNICAL FIELD

The present disclosure relates to the technical field of automotive chip functional safety and in particular, to a system and method for fast diagnosis of register of lockstep module of slow clock domain.

BACKGROUND

With continuous development of automobile automation and intelligence, there are more electronic components in automobiles, and functional safety of automotive chips is becoming more and more important. Lockstep architecture is often used in automotive chips with higher functional safety levels. The standard chip ensures the safe operation of the chip through a dual redundancy mode of core 0 (functional IP core) and core 1 (lockstep IP core). It is one of the main safety detection methods to determine whether the module is operating normally by reading out and comparing the lockstep registers of the functional IP core and the lockstep IP core. For a lockstep architecture of a slow clock domain, a traditional detection method requires at least two slow clocks. Therefore, increasing the reading and determination speed to improve detection efficiency is of great significance for improving system efficiency and security.

Generally in the lockstep system, the functional IP core have a set of functional registers and the lockstep IP core have a set of lockstep registers correspondingly.

At present, in most of the lockstep register determination methods, the values of the lockstep register are read directly through a same-frequency lockstep interface, i.e., advanced peripheral bus (APB). Then whether the values are equal on the lockstep interface hardware are determined directly and automatically. If the interface clock is very slow, reading the values (to the CPU) takes up a lot of (bus) time, thereby greatly reducing the efficiency of the system.

SUMMARY

One aspect of the present disclosure provides a system for a fast diagnosis of a register of a lockstep module of a slow clock domain, including a functional intellectual property (IP) core and a lockstep IP core configured to work in the slow clock domain, a fast bus module configured to read a value of a register of the functional IP core and a value of a register of the lockstep IP core, and record a state change of the register of the functional IP core, and a central processing unit (CPU) configured to determine whether the register of the functional IP core and the register of the lockstep IP core are normal according to the value of the register of the functional IP core, the value of the register of the lockstep IP core, and the state change of the register of the functional IP core.

Another aspect of the present disclosure provides a method for a fast diagnosis of a register of a lockstep module of a slow clock domain, including allocating read and write addresses of a register of a functional intellectual property (IP) core and a register of a lockstep IP core of the slow clock domain, reading a value of the register of the functional IP core and a value of the register of the lockstep IP core, and recording a state change of the register of the functional IP core and a state change of the register of the lockstep IP core, and determining whether the register of the functional IP core and the register of the lockstep IP core are normal according to the value of the register of the functional IP core, the value of the register of the lockstep IP core, and the state change of the register of the functional IP core.

Another aspect of the present disclosure provides a non-transitory computer-readable storage medium storing a computer program that, when the computer program being executed by at least one processor, causing the at least one processor to perform allocating read and write addresses of a register of a functional intellectual property (IP) core and a register of a lockstep IP core of the slow clock domain, reading a value of the register of the functional IP core and a value of the register of the lockstep IP core, and recording a state change of the register of the functional IP core, and determining whether the register of the functional IP core and the register of the lockstep IP core are normal according to the value of the register of the functional IP core, the value of the register of the lockstep IP core, and the state change of the register of the functional IP core.

DETAILED DESCRIPTION OF THE EMBODIMENTS

Figure 1:
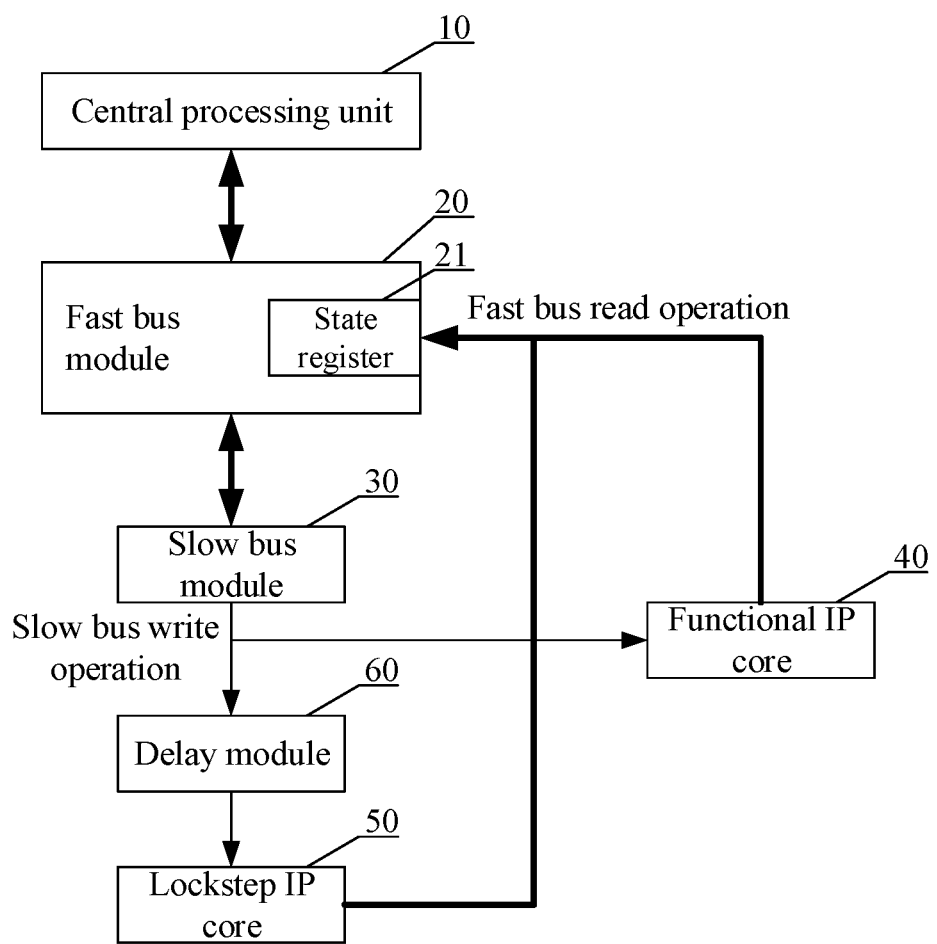
FIG. 1 is a schematic architecture diagram of a system for a fast diagnosis of a register of a lockstep module of a slow clock domain according to an example embodiment consistent with the disclosure.

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

For ease of description, only the parts related to the relevant disclosure are shown in the drawings. The embodiments of the present disclosure and features in the embodiments can be combined with each other when there is no conflict.

Unless otherwise defined, the terms "a," "an," and/or "the" do not specifically refer to the singular but may also include the plural. The terms "include" only suggest that the processes and elements that have been clearly identified are included, and these processes and elements do not constitute an exclusive list, and the method or device may also include other processes or elements. The element defined by the phrase "including a . . . " does not exclude the existence of other identical elements in the process, method, commodity, or equipment that includes the element.

It should be noted that the modifications of "one" and "a plurality of" mentioned in the disclosure are illustrative and not restrictive. Those skilled in the art should understand that unless the context clearly indicates otherwise, it should be understood as "one or more." "A plurality of" should be understood as two or more.

In addition, flow charts are used to illustrate the operations performed by the system according to the embodiments of the disclosure. The preceding or following operations are not necessarily performed exactly in order. Instead, the processes can be processed in reverse order or at the same time. Also, other operations can be added to these processes, or one or more operations can be removed from these processes.

Lockstep refers to a common method that uses a functional core and a mirrored core (i.e., lockstep core) for redundancy comparisons to ensure functional safety of chips.

Slow clock domain refers to a clock domain with a relatively small frequency, for example, one-fifth, one tenth, one hundredth, or several thousandths of a frequency of a fast clock domain.

Fast clock domain refers to a clock domain with a relatively high frequency, for example, five times, dozens of times, hundreds of times, or thousands of times of the frequency of the slow clock domain.

Intellectual property (IP) core refers to a chip design reconfigurable circuit module to achieve a certain function. The chip design reconfigurable circuit module can be applied in other chip design projects including the circuit module, thereby reducing the design workload, shortening the design cycle, and improving the success rate of chip design.

Functional IP core refers to a circuit module in the lockstep structure, including a functional part and a register part, and used to realize a certain function.

Lockstep IP core refers to a lockstep (mirrored) module in the lockstep structure, used to compare with the functional IP core to ensure the correct operation of the functional module. If the content of the functional IP core is different from the corresponding content of the lockstep IP, it is determined that the system may not be operating normally.

A relationship between the functional IP core and the lockstep IP core is that a target register of the lockstep IP core is a copy of a target register of the functional IP core but one or more clock cycles slower than the target register of the functional IP core. In an example embodiment of the present disclosure, the lockstep IP core is one clock cycle slower than the functional IP core.

In some embodiments, a system for a fast diagnosis of a register of a lockstep module of a slow clock domain adopts a central processing unit (CPU) to check the register of the lockstep module of the slow clock domain. Through the cooperation of software and hardware, when the lockstep module works at a low frequency, the system efficiency can be greatly improved.

FIG. 1 is a schematic architecture diagram of a system for a fast diagnosis of a register of a lockstep module of a slow clock domain according to an example embodiment consistent with the disclosure. As shown in FIG. 1, the system 1 for the fast diagnosis of the register of the lockstep module of the slow clock domain includes a central processing unit (CPU) 10, a fast bus module 20, a slow bus module 30, a functional IP core 40, a lockstep IP core 50, and a delay module 60.

The CPU 10 is configured to determine whether a register of the functional IP core 40 and a register of the lockstep IP core are normal according to a value of the register of the functional IP core 40 read by the fast bus module 20, a value of the register of the lockstep IP core 50 read by the fast bus module 20, and a state change of the register of the functional IP core 40 during the two readings, to check the register of the lockstep module of the slow clock domain.

The fast bus module 20 is configured to read the value of the register of the functional IP core 40 of the slow clock domine and the value of the register of the lockstep IP core 50 of the slow clock domain according to an instruction of the CPU 10, and to record a value of a state register 21 of the fast bus module 20.

The state register 21 is configured to record the state change of the register of the functional IP core 40 when the fast bus module 20 reads the values of the registers of the functional IP core 40 and the lockstep IP core 50 of the slow clock domain. If the current value of the register changes relative to the previous value of the register, the state of the register changes, otherwise the state of the register does not change.

In some embodiments, the state register 21 can obtain a change signal of the functional IP core 40. In an example embodiment, in response to a state of a register in a current clock changing, the change signal is 1, and the rest of the time is 0. In another example embodiment, in response to the state of the register in the current clock not changing, the change signal is 1, and the rest of the time is 0, which is not limited here.

The functional IP core 40 works in the slow clock domain, accepts a read operation of the CPU 10 through the fast bus module 20, and accepts a write operation of the CPU 10 through the slow bus module 30.

The lockstep IP core 50 works in the slow clock domain, accepts the read operation of the CPU 10 through the fast bus module 20, and accepts the write operation of the CPU 10 through the slow bus module 30.

In some embodiments, when the lockstep IP core 50 accepts the write operation of the CPU 10, the delay module 60 delays the write operation of the functional IP core 40 by one slow clock cycle.

In some embodiments, the CPU 10 determines whether the system is running normally by reading the value of the register of the functional IP core 40, the value of the register of the lockstep IP core 50, and the value of the state register 21. The values of the registers of the functional IP core 40 and the lockstep IP core 50 are read as reg0 and reg1, respectively. The values of the change signal of the functional IP core 40 obtained twice during the period are read as bit0 and bit1, respectively.

In some embodiments, the CPU 10 reads the value of the functional IP core 40 in one clock cycle, as the state register 21 obtains the change signal of the functional IP core 40. The CPU 10 reads the value of the lockstep IP core 50 in another clock cycle, as the state register 21 obtains the change signal of the functional IP core 40.

When bit0=1 and bit1=1, it is determined that the reading of reg0 and reg1 occurs in a slow clock cycle, the register of the functional IP core has changed relative to a previous slow clock cycle, the obtained value is invalid, and the value of the register needs to be read again.

When bit0=1 and bit1=0, it is determined that the register of the functional IP has changed from the previous slow clock cycle to a current slow clock cycle, the reading of reg1 occurs in another slow clock cycle, the obtained values are valid. The value of reg0 and the value of reg1 should be equal. If the value of reg0 is not equal to the value of reg 1, it is determined that the system is running abnormally.

When bit0=0 and bit1=0, it is determined that the registers of the functional IP core 40 and lockstep IP core 50 have not changed, and the obtained values are valid. The value of reg0 and the value of reg1 should be equal. If the value of reg0 is not equal to the value of reg 1, it is determined that the system is running abnormally.

When bit0=0 and bit1=1, it is determined that the reading of the register of the functional IP core 40 and the reading of the register of the lockstep IP core 50 occur in two different slow clock cycles, respectively, the obtained values are valid. The value of reg0 and the value of reg1 should be equal. If the value of reg0 is not equal to the value of reg 1, it is determined that the system is running abnormally.

In the embodiments of the disclosure, another clock cycle refers to a next fast clock cycle of a current fast clock cycle, or a next fast clock cycle separated from the current fast clock cycle by multiple fast clock cycles. The current fast clock cycle and the another fast clock cycle should be in a same slow clock cycle, or in adjacent slow clock cycles, respectively.

In the embodiments of the disclosure, the another clock cycle may refer to a previous fast clock cycle of the current fast clock cycle, or a previous fast clock cycle separated from the current fast clock cycle by multiple fast clock cycles. The current fast clock cycle and the another fast clock cycle should be in a same slow clock cycle, or in adjacent slow clock cycles, respectively.

In the embodiments of the disclosure, the change signal of the functional IP core 40 may be obtained and stored in the state register 21 during the value of the register of the functional IP core 40 is read and stored in reg0. If the change signal indicates that the value of the register of the functional IP core 40 has not changed, the value of the register is valid. Then the value of the register of the lockstep IP core 50 is obtained and stored in reg1 without obtaining the relevant change signal. The CPU 10 compares the value of reg0 and the value of reg1. If the value of reg0 is equal to the value of reg1, the CPU 10 determines that the system is operating normally. If the value of reg0 is not equal to the value of reg1, the CPU 10 determines that the system is out of order.

In some embodiments, the change signal of the functional IP core 40 may be obtained and stored in the state register 21 during the value of the register of the functional IP core 40 is read and stored in reg0. If the change signal indicates that the value of the register of the functional IP core 40 has changed, the change signal of the functional IP core 40 may be obtained again and stored in the state register 21 during the value of the register of the lockstep IP core 50 is obtained and stored in reg1. If the change signal indicates that the value of the register of the functional IP core 40 has not changed, the value of the register is valid and does not need to be re-read. The CPU 10 compares the value of reg0 and the value of reg1. If the value of reg0 is equal to the value of reg1, the CPU 10 determines that the system is operating normally. If the value of reg0 is not equal to the value of reg1, the CPU 10 determines that the system is out of order. If the change signal obtained at the second time indicates that the value of the register of the functional IP core 40 has also changed, the value of the register is invalid. The value of the register of the functional IP core 40 and the value of the register of the lockstep IP core 50 need to be read again.

In some embodiments, the timing of re-reading the value of the register may be in the next fast clock cycle, or may be delayed for multiple fast clock cycles, which is not limited here.

In some embodiments, reading of the value of the register of the functional IP core 40 and the value of the register of the lockstep IP core 50 includes performing a window detection to avoid a metastable stage, directly reading the functional IP core 40 and the lockstep IP core 50 through a fast bus with a relatively high frequency, and sending the values of the registers to the CPU 10. The CPU 10 determines whether the register of the functional IP core is normal and whether the system is operating normally by analysis.

The metastable stage refers to that a flip-flop cannot reach an identifiable state within a specified period of time. Each flip-flop has a specified setup and hold time parameters. Within the time window specified by the setup and hold time parameters, an input signal is not allowed to change on a rising edge of the clock. If the data of the data input port of the flip-flop changes (or updated) within the time window, a timing violation occurs, and the output of the flip-flop hovers at an unpredictable level state, that is, the metastable state.

Figure 2:
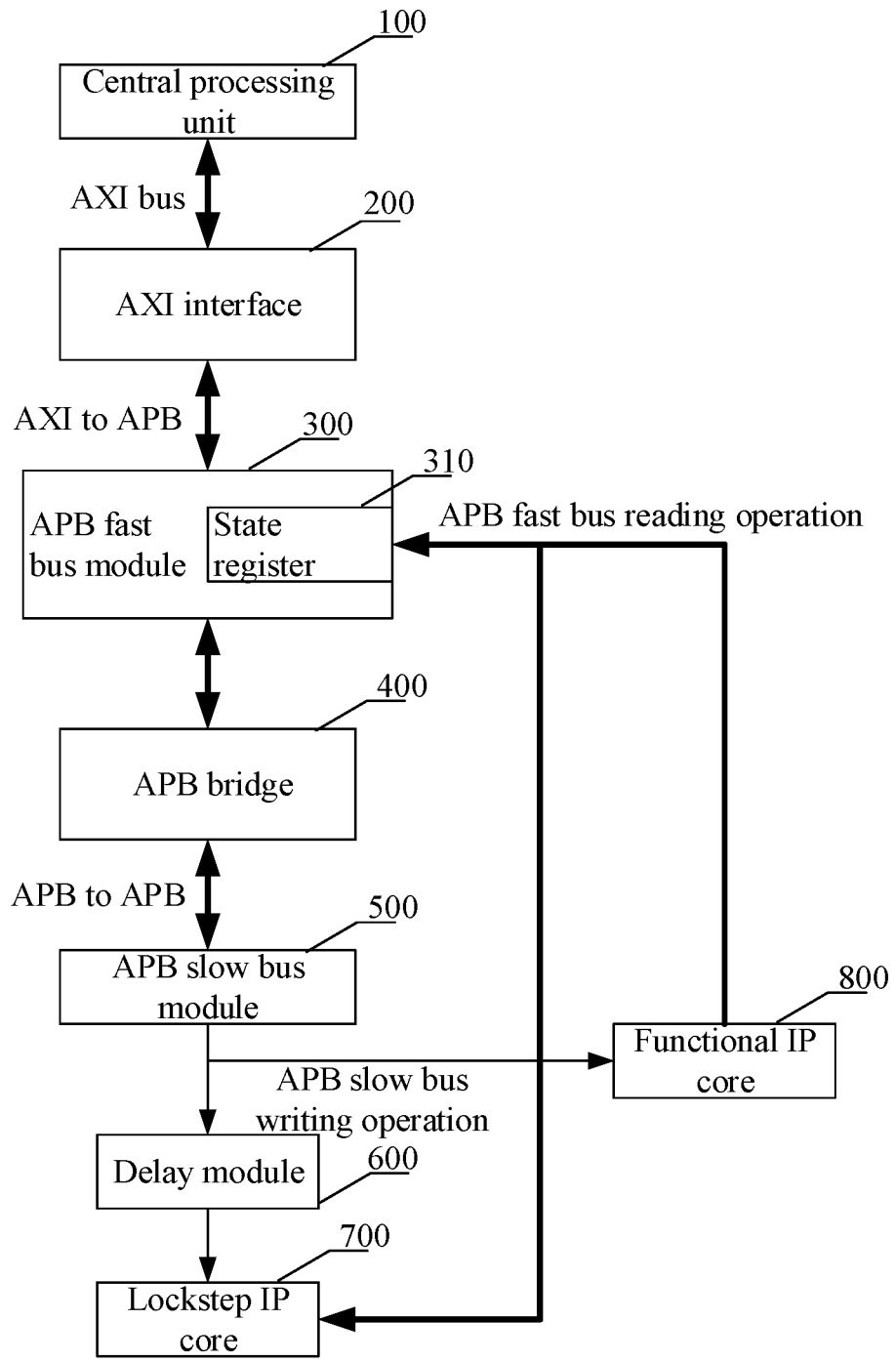
FIG. 2 is a schematic architecture diagram of a system for a fast diagnosis of a register of a lockstep module of a slow clock domain according to another example embodiment consistent with the disclosure.

FIG. 2 is a schematic architecture diagram of a system for a fast diagnosis of a register of a lockstep module of a slow clock domain according to another example embodiment consistent with the disclosure. As shown in FIG. 2, the system for the fast diagnosis of the register of the lockstep module of the slow clock domain includes a central processing unit (CPU) 100, an advanced extensible interface (AXI) interface 200, an advanced peripheral bus (APB) fast bus module 300, an APB bridge 400, an APB slow bus module 500, a delay module 600, a lockstep IP core 700, and a functional IP core 800.

The CPU 100 is connected to the APB fast bus module 300 through the AXI interface 200.

The APB slow bus module 500 is configured to perform write operation to a register of the functional IP core 800 and a register of the lockstep IP core 700, respectively. The APB slow bus module 500 has a delay of one clock cycle for the writer operation of the register of the lockstep IP core 700 compared to the write operation of the register of the functional IP core 800.

A state register 310 of the APB fast bus module 300 is used to obtain a change signal of the functional IP core or the lockstep IP core, to obtain a state change of the register of the functional IP core or the register of the lockstep IP core. In some embodiments, the state register 310 includes an automatic variable register in the current clock. When a state of the automatic variable register in the current clock changes, the change signal is 1, and the rest of the time is 0; or when the state of the automatic variable register in the current clock changes, the change signal is 0, and the rest of the time is 1, which is not limited here.

The CPU 100 is configured to read a value of the register of the functional IP core 800 and a value of the register of the lockstep IP core 700 through the APB fast bus module 300. The state register 310 is configured to record the state change of the register of the functional IP core 800 and the state change of the register of the lockstep IP core 700, and send the state change of the register of the functional IP core 800 and the state change of the register of the lockstep IP core 700 to the CPU 100. Two values of the change signal, one for the reading of the functional IP core 800 and one for the reading of the lockstep IP core 700, are recorded as bit0 and bit1, respectively. The value of the automatic variable register of the functional IP core 800 and the value of the automatic variable register of the lockstep IP core 700 are recorded as reg0 and reg1, respectively.

The CPU 100 is configured to determine whether the system is running normally according to the value of the register of the functional IP core 800, the value of the register of the lockstep IP core 700, and the state change of the state register 310.

When bit0=1 and bit1=1, it is determined that the reading of reg0 and reg1 occurs in a same slow clock cycle, the register of the functional IP core has changed from a slow clock cycle to a next slow clock cycle, the value of the register is invalid, and the value of the register needs to be re-read.

When bit0=0 and bit1=1, it is determined that the reading of reg1 occurs in the next slow clock cycle after the reading of reg 0. According to the difference between the functional IP core and lockstep IP core by one clock cycle, the value of the register is valid and does not need re-read. The value of reg0 and the value of reg1 should be equal. If the value of reg0 is not equal to the value of reg 1, it is determined that the system is running abnormally.

When bit0=1 and bit1=0, it is determined that the reading of reg0 and reg1 occurs in a same slow clock cycle, the register of the functional IP core has changed from the slow clock cycle to the next slow clock cycle, the value of the register is invalid, and the value of the register needs to be re-read.

When bit0=0 and bit1=0, it is determined that the registers of the functional IP core 800 and lockstep IP core 700 have not changed, and the obtained values are valid. The value of reg0 and the value of reg1 should be equal. If the value of reg0 is not equal to the value of reg 1, it is determined that the system is running abnormally.

In some embodiments, reading of the value of the register of the functional IP core 800 and the value of the register of the lockstep IP core 700 includes performing a window detection to avoid a metastable stage, directly reading the functional IP core 800 and the lockstep IP core 700 through the APB fast bus module 300 with a relatively high frequency, and sending the values of the registers to the CPU 100. The CPU 100 determines whether the registers of the functional IP core 800 and the lockstep IP core 700 are normal, and whether the system is operating normally by analysis.

In some embodiments, a clock frequency of the APB fast bus module 300 is five times or higher than a clock frequency of the APB slow bus module 500. The corresponding clock frequency of the APB slow bus module 500 is one-fifth or lower than the clock frequency of the APB fast bus module 300.

In some embodiments, the state change of the register of the lockstep IP core 700 may be read twice during the reading of the value of the register of the functional IP core 800 and the reading of the value of the register of the lockstep IP core 700, respectively. If one value of the state change indicates that the value of the register of the lockstep IP core 700 has not changed, and another value of the state change indicates that the value of the register of the lockstep IP core 700 has changed, the value is valid and does not need to be read again. When the frequency of the fast clock is much higher than the frequency of the slow clock, a possibility of detecting this situation is relatively low, and the operation efficiency of the system is relatively low.

In some embodiments, there can be a plurality of lockstep IP cores, for example, two lockstep IP cores, or more. Each pair of adjacent IP cores can be determined using the system as described above.

Figure 3:
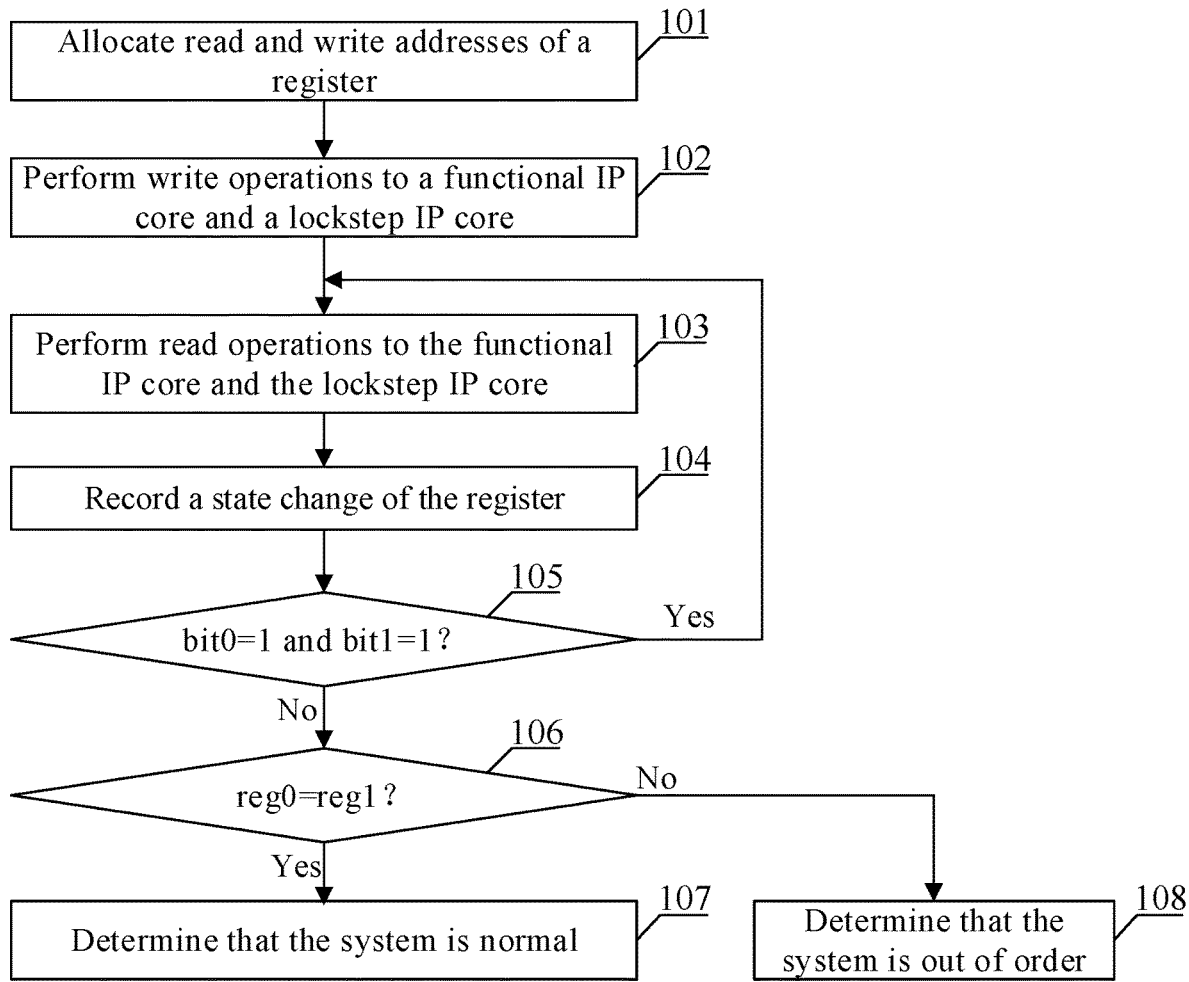
FIG. 3 is a schematic flow chart of a method for a fast diagnosis of a register of a lockstep module of a slow clock domain consistent with embodiments of the disclosure.

FIG. 3 is a schematic flow chart of a method for a fast diagnosis of a register of a lockstep module of a slow clock domain consistent with embodiments of the disclosure. As shown in FIG. 3, the method includes the following processes.

In some embodiments, an APB fast bus (Fast APB) is used as an example to describe the fast diagnosis of the register. It can be understood that the fast bus may also use another fast bus, which is not limited here.

At 101, read and write addresses of a register of a functional IP core and a register of a lockstep IP core are allocated.

Because the read operations to the functional IP core and the lockstep IP core can be performed separately, the registers of the functional IP core and the lockstep IP core may have different addresses for the read operations, and a same address or different addresses for the write operations. In response to reading, a first address may be allocated to the register of the lockstep IP core, and a second address may be allocated to the register of the functional IP core, where the second address is different from the first address by a high address. For example, the addresses are allocated as shown in Table 1, but are not limited here.

TABLE 1

| Cores | Read address | Write address |
|---|---|---|
| Functional IP core | addr[15:14] == 2'b00 | addr[15:14] == 2'b0x |
| Lockstep IP core | addr[15:14] == 2'b01 | addr[15:14] == 2'b0x |

In some embodiments, an address of a state register may be allocated in response to the state register being not in the functional IP core or the lockstep IP core.

At step 102, write operations are performed to the functional IP core and the lockstep IP core, where the writing of the register of the lockstep IP core has a delay of one clock cycle compared to the writing of the register of the functional IP core.

At step 103, read operations are performed to the register of the functional IP core and the register of the lockstep IP core through the APB window to avoid a metastable stage.

When the registers change on the rising edge of a clock, an unreliable area of the registers of the lockstep module of the slow clock domain is near the rising edge of the slow clock. The value of the register is in a state of change, and the rest of the time can be considered stable and reliable. The unreliable area is determined by obtaining a conversion signal of the change from the fast clock to the slow clock on the rising edge (the clock cannot be directly used to collect data, and the conversion is thus needed). If the reading of the register of the fast clock falls in the unreliable area, re-read the register. If the reading of the register of the fast clock falls in the reliable area, it can be determined that the data read is valid.

Figure 4:
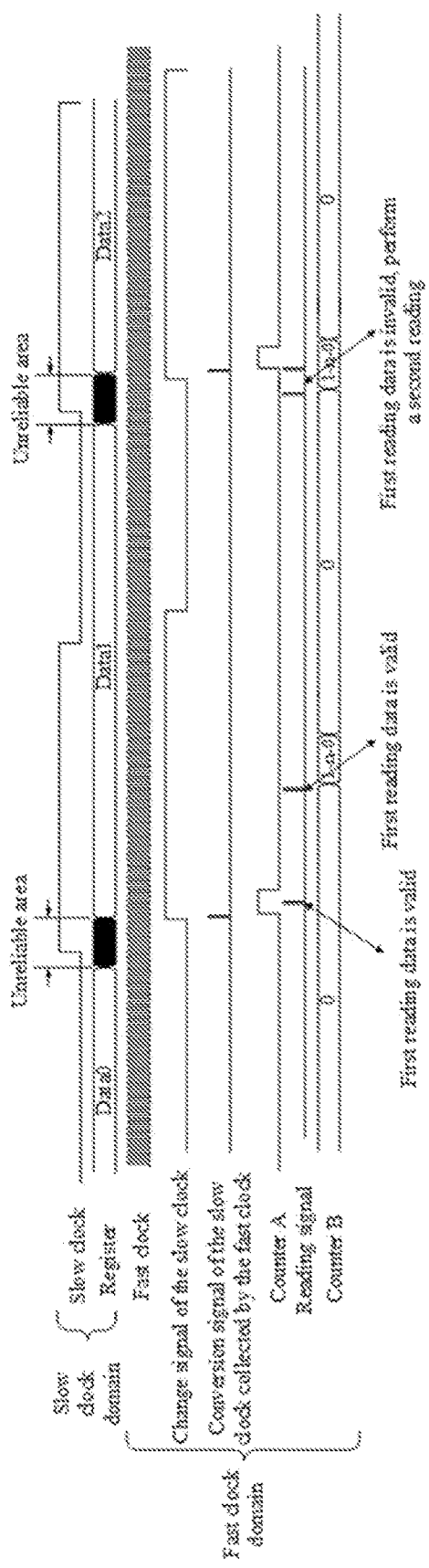
FIG. 4 is a timing diagram of a fast lock reading a slow register.

FIG. 4 is a timing diagram of a fast lock reading a slow register. As shown in FIG. 4, at 103, when the rising edge of the conversion signal of the slow clock is collected by the fast clock, the counter A is started to count 1-n-0 (or using n-bit shift counter to shift the rising edge pulse). When the reading falls to that the counter A is a non-zero (or there is 1 in the shift register) or falls to the rising edge pulse of the conversion signal of the slow clock, a slow clock rising edge has just passed, it can be determined that the data read is valid. When the reading falls to that the counter A is 0, then counter B is started to count 1-n-0 when the read comes. When the reading falls to that the counter B returns to 0 and there is no rising edge pulse of the conversion signal of the slow clock during the reading, it can be determined that the data read is valid. When the rising edge pulse of the conversion signal of the slow clock is encountered during the reading, it is determined that the data read is invalid, and a second reading is performed at the rising edge pulse, and the second reading at this time is valid.

A read operation costs at most n+1 fast clock domain clocks, where n can be set according to the actual frequency. For example, the slow clock domain (32K) and the fast clock domain (100 M) have a large difference, which is more than 3000 times, n=6 may be set to meet the timing constraints, then the data reading speed can be greatly improved (more than 500 times).

At 104, a state register is recorded synchronously.

Figure 5:
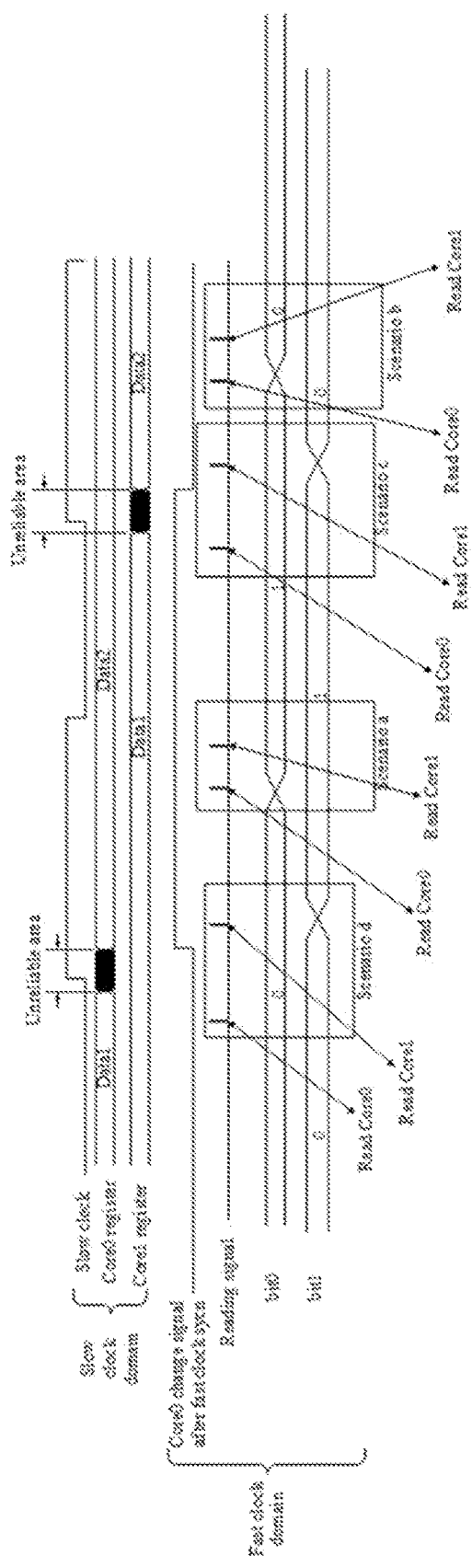
FIG. 5 is a diagnostic timing diagram of the slow register.

For registers that can only be changed by software write operation, the registers can be read and compared directly for diagnosis. For registers that change automatically internally, a diagnosis after process 104 is required. Such registers are also called as automatic variable registers. FIG. 5 is a diagnostic timing diagram of the slow register. Assuming that the functional IP core and the lockstep IP core differ by one slow clock cycle. In the lockstep module, the functional IP core is faster than the mirrored lockstep IP core by one slow clock cycle. If the fast reading of the functional IP core and the lockstep IP core are in a same slow clock domain CLK, the register of the functional IP core of the CLK has changed, but value of the register of the lockstep IP core is still the value when the functional IP core is in the previous clock, then the value of the register of the lockstep IP core is not equal to the value of the register of the functional IP core, but in fact the system is running normally. At this time, a method is needs to determine whether such situation occurs and determine to continue to start a next diagnosis in response to the situation.

Specifically, at 104, a change signal is added in the functional IP core. When there is an automatic variable register state change in the current clock, the change signal is 1, and the rest of the time is 0. The change signal in the functional IP core is locked (the change signal does not need to be synchronized, because there is a window detection to avoid) and saved simultaneously as the values of the registers of the functional IP core and the lockstep IP core are read. The two values of the change signal (one for the reading of the functional IP core and one for the reading of the lockstep IP core) are bit0 and bit1, respectively. The values of the automatic variable registers of the functional IP core and the lockstep IP core are reg0 and reg1, respectively.

Four scenarios may appear: bit0=1 and bit1=1 (scenario a); bit0=1 and bit1=0 (scenario b); bit0=0 and bit1=0 (scenario c); and bit0=0 and bit1=1 (scenario d).

At 105, whether bit0 and bit1 are both equal to 1 is determined. When bit0=1 and bit1=1, it is determined that the reading of reg0 and reg1 may occur in a same slow clock cycle, the register of the functional IP core has changed relative to the previous slow clock cycle, the value of the register needs to be re-read. If re-read is needed, return to process 103, otherwise, go to process 106.

At 106, whether the value of reg0 and the value of reg1 of the automatic variable registers of the functional IP core and the lockstep IP core are the same is determined. When at least one of bit0 or bit1 is 0, whether the values of reg0 and reg1 are the same is determined. When the value of reg0 is equal to the value of reg1, it is determined that the system is normal, otherwise it is determined that the system is out of order. When bit0=1 and bit1=0, the functional IP register has changed from the previous clock cycle to the current clock cycle, the reading of reg1 occurs in another clock cycle, the value of the reg0 should be equal to the value of reg1. If not, the system is out of order. When bit0=0 and bit1=0, the registers of the functional IP core and the lockstep IP core have not changed. If the values of the registers are different, it is determined that the system is out of order. When bit0=0 and bit1=1, the reading of the functional IP core and the reading of the register of the lockstep IP core occur in different clock cycle. If the values of reg0 and reg1 are different, it is determined that the system is out of order.

In some embodiments, processes 101 to 104 are measures for underlying hardware.

In some embodiments, determining whether a value of a variable register and a value of a mirrored register are equal to determine whether the system is normal can improve the efficiency of the reading and the diagnosis of the register of the lockstep module of the slow clock domain.

In some embodiments, a single change signal may be used for determination for several variable registers whose change frequency is not high, to save chip resources.

In some embodiments, the APB interface is taken as an example for description, which is applicable to the general practice of the fast clock module, and the comparison is performed in the hardware, which is not limited here.

According to the disclosure, a combination of software and hardware is adopted to fast read the registers of the lockstep module of the slow clock domain using the fast clock. The diagnosis processes are put in the software. The greater the difference between the fast and slow clocks, the more significant of the improved efficiency.

In some embodiments, there is also provided an on-board chip including the system for the fast diagnosis of the register of the lockstep module of the slow clock domain as described in the above embodiments.

Figure 6:
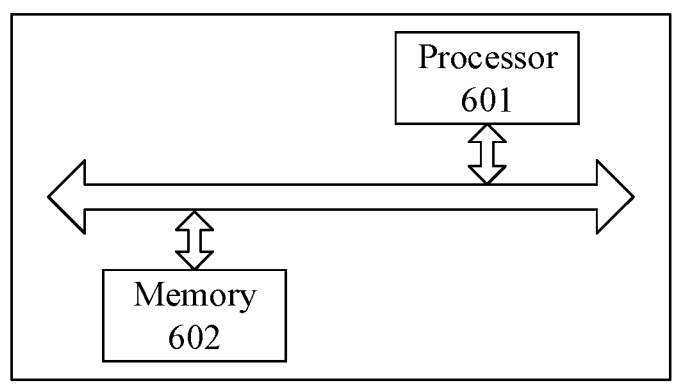
FIG. 6 is a schematic structural diagram of an electronic device according to an example embodiment consistent with the disclosure.

FIG. 6 is a schematic structural diagram of an electronic device according to an example embodiment consistent with the disclosure. As shown in FIG. 6, the electronic device of the present disclosure includes a processor 601 and a memory 602.

The processor 601 adopts the on-board chip of the above embodiments.

The memory 602 stores a computer program, and when the computer program is read and executed by the processor 601, it executes the processes of the method for the fast diagnosis of the registers of the lockstep module of the slow clock domain as described above.

In some embodiments, a non-transitory computer-readable storage medium is also provided, and a computer program is stored in the non-transitory computer-readable storage medium. When the computer program is read and executed by the processor 601, it executes the processes of the method for the fast diagnosis of the registers of the lockstep module of the slow clock domain as described above.

In some embodiments, the non-transitory computer-readable storage medium may include but not limited to a USB disk, a read-only memory (ROM), a random-access memory (RAM), a removable hard disk, a magnetic disk, or an optical disk, etc.

Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the invention being indicated by the following claims.

What is claimed is:

1. A system for diagnosing a register of a lockstep module of a slow clock domain, comprising:
   a functional intellectual property (IP) core and a lockstep IP core configured to work in the slow clock domain;
   a fast bus module configured to:
      read a value of a register of the functional IP core and a value of a register of the lockstep IP core; and
      record a state change of the register of the functional IP core; and
   a central processing unit (CPU) configured to determine whether the register of the functional IP core and the register of the lockstep IP core are normal according to the value of the register of the functional IP core, the value of the register of the lockstep IP core, and the state change of the register of the functional IP core.

2. The system of claim 1, wherein the fast bus module is further configured to:
   record the state change of the register of the functional IP core in response to a first fast clock cycle reading the value of the register of the functional IP core; and
   record the state change of the register of the functional IP core in response to a second fast clock cycle reading the value of the register of the lockstep IP core.

3. The system of claim 1, wherein the fast bus module is further configured to:
   record the state change of the register of the functional IP core in response to a first fast clock cycle reading the value of the register of the functional IP core; and
   record a state change of the register of the lockstep IP core in response to a second fast clock cycle reading the value of the register of the lockstep IP core.

4. The system of claim 1, further comprising:
   a state register configured to record the state change of the register of the functional IP core and a state change of the register of the lockstep IP core.

5. The system of claim 4, wherein the state register is further configured to record the state change of the register of the functional IP core and the state change of the register of the lockstep IP core using a displacement mechanism.

6. The system of claim 4, wherein the state register is further configured to record a state change of an automatic variable register of at least one of the functional IP core or the lockstep IP core, the automatic variable register including a register capable of changing automatically.

7. The system of claim 2, wherein the CPU is further configured to:
   in response to reading the value of the register of the functional IP core and the value of the register of the lockstep IP core:
      in response to a state of the register of the functional IP core being changed, re-read the value of the register of the functional IP core and the value of the register of the lockstep IP core; and
      in response to the state of the register of the functional IP core changing at most once, and the value of the register of the functional IP core being not equal to the value of the register of the lockstep IP core, determine that the register of the functional IP core and the register of the lockstep IP core are out of order.

8. The system of claim 1, wherein the CPU is further configured to, in response to reading the value of the register of the functional IP core and the value of the register of the lockstep IP core:
   perform a window detection; and
   determine that the value of the register of the functional IP core and the value of the register of the lockstep IP core are valid in response to a result of the window detection indicating that reading does not occur in a metastable stage.

9. A method for diagnosing a register of a lockstep module of a slow clock domain, comprising:
   allocating a read and write address of a register of a functional intellectual property (IP) core and a register of a lockstep IP core of the slow clock domain;
   reading a value of the register of the functional IP core and a value of the register of the lockstep IP core, and recording a state change of the register of the functional IP core; and
   determining whether the register of the functional IP core and the register of the lockstep IP core are normal according to the value of the register of the functional IP core, the value of the register of the lockstep IP core, and the state change of the register of the functional IP core.

10. The method of claim 9, wherein allocating the read and write address of the register of the functional IP core and the register of a lockstep IP core of the slow clock domain includes:
    in response to writing, allocating a same address to the register of the functional IP core and the register of the lockstep IP core; and
    in response to reading, allocating a first address to the register of the lockstep IP core and a second address to the register of the functional IP core, the second address being different from the first address by a high address.

11. The method of claim 9, wherein reading the value of the register of the functional IP core and the value of the register of the lockstep IP core, and recording the state change of the register of the functional IP core and the state change of the register of the lockstep IP core, includes:
    recording the state change of the register of the functional IP core in response to a first fast clock cycle reading the value of the register of the functional IP core; and
    recording the state change of the register of the functional IP core in response to a second fast clock cycle reading the value of the register of the lockstep IP core.

12. The method of claim 9, wherein reading the value of the register of the functional IP core and the value of the register of the lockstep IP core, and recording the state change of the register of the functional IP core and the state change of the register of the lockstep IP core, includes:
    recording the state change of the register of the functional IP core in response to a first fast clock cycle reading the value of the register of the functional IP core; and
    recording the state change of the register of the lockstep IP core in response to a second fast clock cycle reading the value of the register of the lockstep IP core.

13. The method of claim 9, wherein determining whether the register of the functional IP core and the register of the lockstep IP core are normal according to the value of the register of the functional IP core, the value of the register of the lockstep IP core, and the state change of the register of the functional IP core, includes:
    in response to reading the value of the register of the functional IP core and the value of the register of the lockstep IP core:

in response to a state of the register of the functional IP core being changed, re-reading the value of the register of the functional IP core and the value of the register of the lockstep IP core; and in response to the state of the register of the functional IP core changing at most once, and the value of the register of the functional IP core being not equal to the value of the register of the lockstep IP core, determining that the register of the functional IP core and the register of the lockstep IP core are out of order.

14. The method of claim 9, wherein determining whether the register of the functional IP core and the register of the lockstep IP core are normal according to the value of the register of the functional IP core, the value of the register of the lockstep IP core, and the state change of the register of the functional IP core, includes:

in response to reading the value of the register of the functional IP core and the value of the register of the lockstep IP core:

performing a window detection; and determining that the value of the register of the functional IP core and the value of the register of the lockstep IP core are valid in response to a result of the window detection indicating that reading does not occur in a metastable stage.

15. A non-transitory computer-readable storage medium storing a computer program that, when the computer program being executed by at least one processor, causing the at least one processor to perform:

allocating read and write addresses of a register of a functional intellectual property (IP) core and a register of a lockstep IP core of a slow clock domain;

reading a value of the register of the functional IP core and a value of the register of the lockstep IP core, and recording a state change of the register of the functional IP core and a state change of the register of the lockstep IP core; and determining whether the register of the functional IP core and the register of the lockstep IP core are normal according to the value of the register of the functional IP core, the value of the register of the lockstep IP core, and the state change of the register of the functional IP core.

16. The non-transitory computer-readable storage medium of claim 15, wherein allocating the read and write addresses of the register of the functional IP core and the register of a lockstep IP core of the slow clock domain includes:

in response to writing, allocating a same address to the register of the functional IP core and the register of the lockstep IP core; and in response to reading, allocating a first address to the register of the lockstep IP core and a second address to the register of the functional IP core, the second address being different from the first address by a high address.

17. The non-transitory computer-readable storage medium of claim 15, wherein reading the value of the register of the functional IP core and the value of the register of the lockstep IP core, and recording the state change of the register of the functional IP core and the state change of the register of the lockstep IP core, includes:

recording the state change of the register of the functional IP core in response to a first fast clock cycle reading the value of the register of the functional IP core; and recording the state change of the register of the functional IP core in response to a second fast clock cycle reading the value of the register of the lockstep IP core.

18. The non-transitory computer-readable storage medium of claim 15, wherein reading the value of the register of the functional IP core and the value of the register of the lockstep IP core, and recording the state change of the register of the functional IP core and the state change of the register of the lockstep IP core, includes:

recording the state change of the register of the functional IP core in response to a first fast clock cycle reading the value of the register of the functional IP core; and recording the state change of the register of the lockstep IP core in response to a second fast clock cycle reading the value of the register of the lockstep IP core.

19. The non-transitory computer-readable storage medium of claim 15, wherein determining whether the register of the functional IP core and the register of the lockstep IP core are normal according to the value of the register of the functional IP core, the value of the register of the lockstep IP core, and the state change of the register of the functional IP core, includes:

in response to reading the value of the register of the functional IP core and the value of the register of the lockstep IP core:

in response to a state of the register of the functional IP core being changed, re-reading the value of the register of the functional IP core and the value of the register of the lockstep IP core; and in response to the state of the register of the functional IP core changing at most once, and the value of the register of the functional IP core being not equal to the value of the register of the lockstep IP core, determining that the register of the functional IP core and the register of the lockstep IP core are out of order.

20. The non-transitory computer-readable storage medium of claim 15, wherein determining whether the register of the functional IP core and the register of the lockstep IP core are normal according to the value of the register of the functional IP core, the value of the register of the lockstep IP core, and the state change of the register of the functional IP core, includes:

in response to reading the value of the register of the functional IP core and the value of the register of the lockstep IP core:

performing a window detection; and determining that the value of the register of the functional IP core and the value of the register of the lockstep IP core are valid in response to a result of the window detection indicating that reading does not occur in a metastable stage.

\* \* \* \* \*